June 27, 1967      A. FORNEY      3,327,577

WELL-POINT AND AUTOMATIC MACHINING APPARATUS

Filed Aug. 13, 1964      3 Sheets-Sheet 1

Arthur Forney
INVENTOR.

BY E. H. Schmidt
ATTORNEY

June 27, 1967            A. FORNEY            3,327,577

WELL-POINT AND AUTOMATIC MACHINING APPARATUS

Filed Aug. 13, 1964            3 Sheets-Sheet 2

Arthur Forney
INVENTOR.

BY E. H. Schmidt
ATTORNEY

June 27, 1967  A. FORNEY  3,327,577
WELL-POINT AND AUTOMATIC MACHINING APPARATUS
Filed Aug. 13, 1964  3 Sheets-Sheet 3
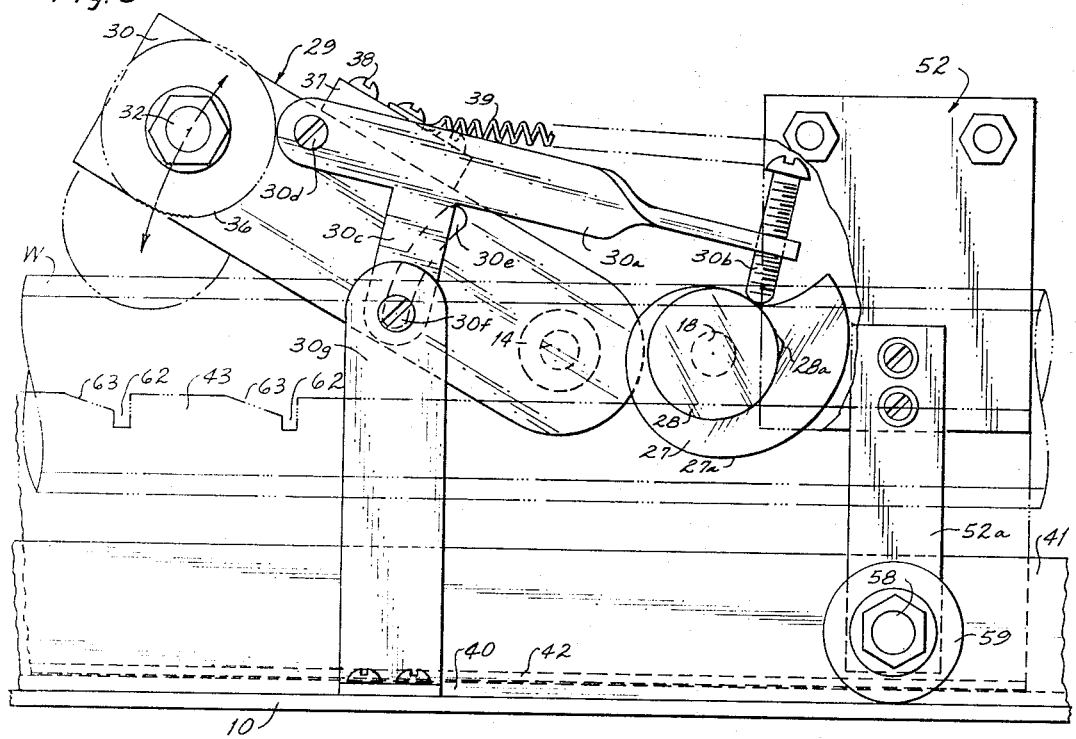
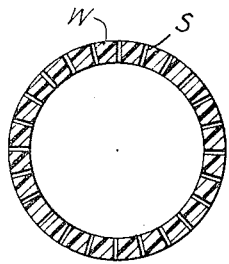
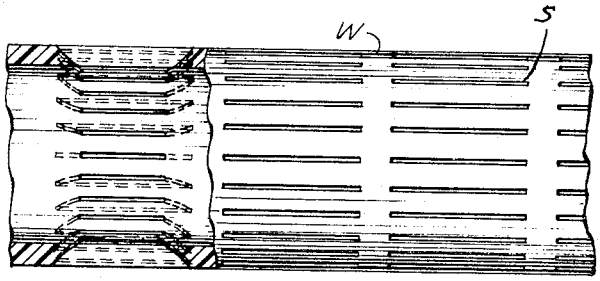
Arthur Forney
INVENTOR.
BY E. H. Schmidt
ATTORNEY United States Patent Office 3,327,577
Patented June 27, 1967

3,327,577
WELL-POINT AND AUTOMATIC
MACHINING APPARATUS
Arthur Forney, 1670 Frederica Drive,
Clearwater, Fla. 33515
Filed Aug. 13, 1964, Ser. No. 389,300
11 Claims. (Cl. 83—220)

My invention relates generally to apparatus for automatically and sequentially performing machining operations both peripherally and longitudinally on tubular or cylindrical work-pieces.

In sinking driven shallow wells, which are commonly used in sandy soil, water table conditions permitting, it has been common practice to use a metal well-point at the lower end of the well piping that is perforated along the side wall to admit water, and screened for straining. Since such well-point openings gradually become corroded and clogged with sand and mineral deposits after a few years service, the length of service depending upon the soil and water conditions of the well, pumping capacity of the well decreases correspondingly. Eventually, the well-point becomes so clogged that the well-point must be removed, cleaned and replaced at considerable cost.

It is accordingly an object of my invention to provide an improved well-point for shallow driven wells that will not corrode readily or clog, and therefore will have a comparatively long productive life. More specifically, my invention contemplates a well-point of an extruded synthetic plastic material that is provided about its periphery and along its length with a plurality of groups of radially-extending slots of such narrow width as to eliminate any need of screening.

It is, moreover, a principal object of my invention to provide automatic mechanism for machining tubular work-pieces in the production of slotted well-points of the above nature.

A more particular object is to provide a machine for automatically and continuously stepwisely rotating and machining a tubular or cylindrical work-piece to provide a peripheral set of machine operations, and stepwisely advancing the work-piece at the completion of each peripheral set of machine operations for performing the next set in axially spaced relation along the length of the work-piece.

Still another object is to provide an automatic machine of the character above described which is particularly well suited for sawing slots in rigid tubing in the manufacture of well-points.

Yet another object is to provide an automatic machine of the character above described which will be simple in structure, easy to operate, and durable in service.

Other objects, features and advantages of my invention will be apparent from the following description when read with reference to the accompanying drawings. In the drawings, wherein like reference numerals denote corresponding parts throughout the several views:

FIG. 5 is a vertical cross-sectional view, on an enlarged scale, taken along the line 5—5 of FIG. 1 in the direction of the arrows and illustrating details of the cam-actuated feed mechanism associated with the slotting saw;

FIG. 6 is a transverse cross-sectional view of a well-point machined by the apparatus of FIGS. 1 through 5, taken along the line 6—6 of FIG. 7 in the direction of the arrows; and FIG. 7 is a fragmentary side view of the well-point shown in FIG. 6, partly in section.

Figure 1:
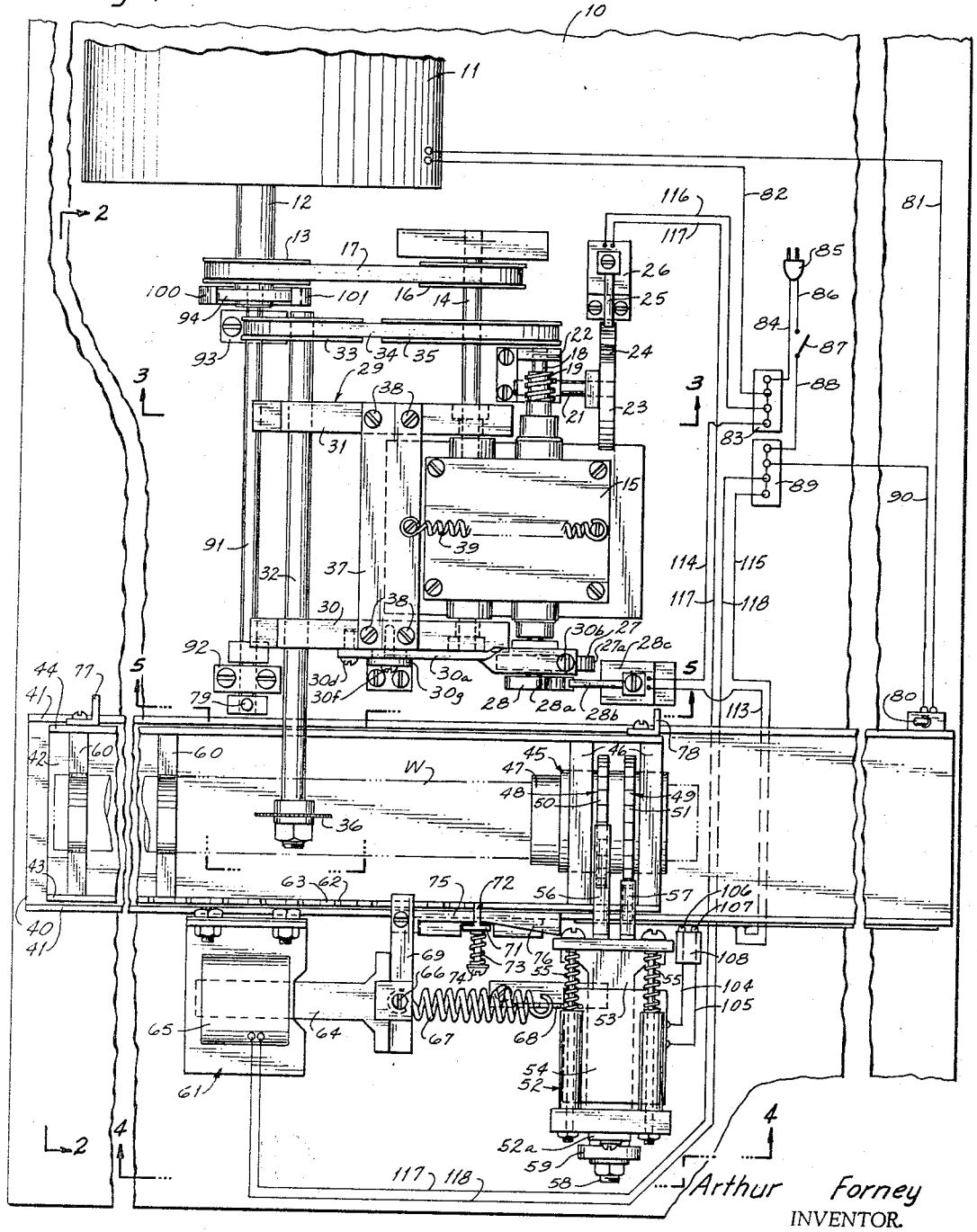
FIG. 1 is a top view, with portions broken away of an automatic tube machining apparatus embodying my invention.

Referring now in detail to the drawings, the automatic machine embodying my invention illustrated in FIGS. 1 through 5 comprises a base plate 10 secured to which is an electric drive motor 11 (partially illustrated in FIG. 1) having an output shaft 12 carrying a pulley wheel 13. Arranged in spaced parallel relation to the motor output shaft 12 is the input shaft 14 of a gear reduction box 15, said gear reduction box also being secured upon the base plate 10. The input shaft 14 carries a pulley wheel 16 in register with the drive motor pulley wheel 13 and mechanically connected therewith by a pulley belt 17.

The gear reduction box 15 has a reduced speed output shaft 18 parallel with the input shaft 14 and extending outwardly of each side of said gear reduction box. One end of the output shaft 18 carries a worm gear 19 in mesh with a pinion 20 carried on a cam shaft 21 journalled in a stanchion 22 supported on the base plate 10 in any convenient manner. The cam shaft 21 carries on its outer end a cam disc 23 having on its outer periphery a cam lobe portion 24 adapted to actuate a suitably-positioned micro-switch arm 25 of a micro-switch 26, said micro-switch being fixed with respect to the base plate 10. The micro-switch controls an energization circuit for a solenoid controlling the translatory movement of the work-piece, as is hereinbelow described. The other end of the output shaft 18 carries a disc cam member 27 and, axially outwardly spaced therefrom, a switch-actuating cam 28. The disc cam member 27 serves to control the swinging movement of a rotary disc saw, now to be described, and the switch-actuating cam 28 has a lobe portion 28a adapted to actuate a suitably-positioned micro-switch arm 28b of a micro-switch 28c, said micro-switch being fixed to the base plate 10. The micro-switch 28c controls the energization circuit of a solenoid for step-wisely rotating a work-piece W, as is hereinafter described.

Figure 2:
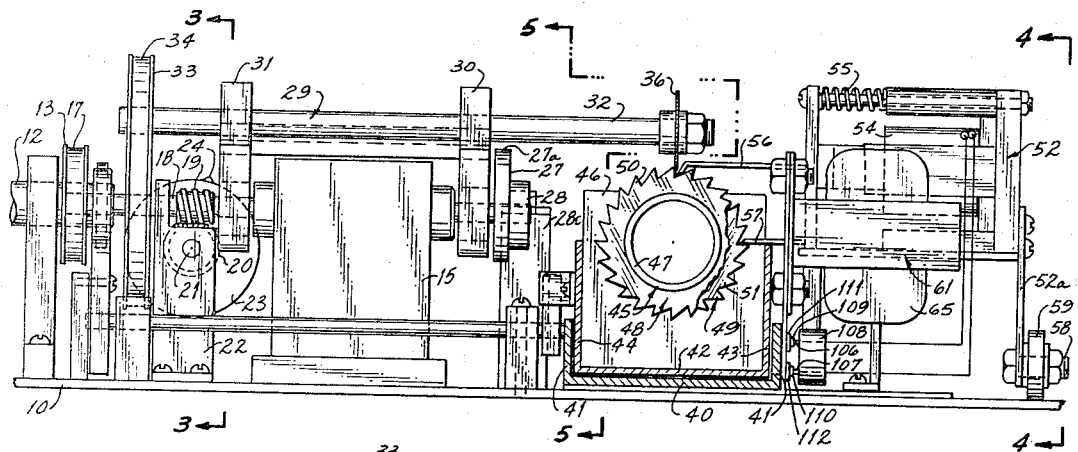
FIG. 2 is an end view thereof, taken along the line 2—2 of FIG. 1 in the direction of the arrows.

As best illustrated in FIG. 2 there is swingably supported on the gear box input shaft 14 a yoke member 29, having yoke arms 30, said yoke member having a pair of opposed paralled side arms 30, 31 journalled at one end on said input shaft at each side of said gear box. A saw shaft 32 is journalled in the outer ends of the yoke arms 30, 31 and extends outwardly at each side thereof and in spaced parallel relation to the input shaft 14. One end of the saw shaft 32 carries a pulley 33 mechanically linked by a belt 34 with a drive pulley 35 on the input shaft 14. It will thus be apparent that the saw shaft 32 will be continuously driven by the electric motor 11 when energized. The saw shaft 32 carries at its other end a small diameter rotary saw disc 36 which is utilized to slot a work-piece, as is hereinbelow described.

The yoke member 29 further comprises a cross-bar 37 secured between the yoke arms 30, 31 about midway along their lengths as by machine screws 38. A tension spring 39 secured at one end to the yoke cross-bar 37, and at the other end to the casing of the gear box 15, serves to resiliently urge the yoke member 29 in an upward position. Means is provided for swinging the yoke 29 downwardly against the urging of tension spring 39 each time the disc cam member 27 makes one revolution. To this end, a stanchion 30g (see FIGS. 1 and 5), secured to the base plate 10 has pivotally journalled at its upper end, as by stud screw 30f, the outer end of a sidewardly-extending intermediate arm portion 30c of a T-shaped linkage member 30a. One end of the linkage member 30a is pivotally secured to the yoke arm 30 of the yoke member 29, and the other end terminates in overlying relation to the disc cam member 27 and has an adjustment screw 30b the end of which is in abutment with the peripheral edge 27a of said disc cam member to be actuated thereby. The peripheral edge 27a of the disc cam member 27 follows a spiral course to effect the desired swinging cycle of the yoke 29 each time said cam disc member makes one revolution. The yoke side arm 30 is provided with an arcuate slot 30e to receive the outwardly-projecting end of the stud screw 30f.

Means is provided for supporting and guiding a tubular work-piece for axial and rotative movement under the saw disc 36, with the axial movement in a plane common with said saw disc. To this end, an elongated, U-shaped guide channel member 40, having short, upstanding side walls 41, is secured against the base plate 10. Seated within the guide channel 40 for sliding movement therealong is an elongated, U-shaped carriage channel 42 having front and back upstanding walls 43 and 44, respectively, that project upwardly beyond the upper ends of the guide channel side walls 41.

Means is provided for supporting the front end of a cylindrical or tubular work-piece within the front end of the carriage channel 42 (the right-hand end as seen in FIG. 1). To this end, a mechanical chuck 45 is centrally fixed thereat as by mounting plates 46. The chuck 45 may be of any of the well known constructions permitting engagement with the work-piece of a rotatably mounted chuck sleeve 47, and is therefore not more particularly described herein. The chuck sleeve 47 has fixed thereto, in spaced axial relation, circular ratchet wheels 48 and 49, having oppositely-directed peripheral saw teeth 50 and 51, respectively.

Figure 4:
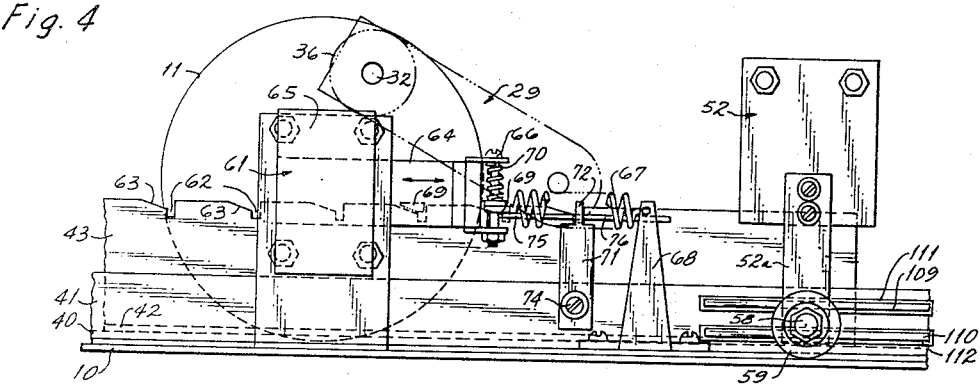
FIG. 4 is side elevational view of the apparatus, taken along the line 4—4 of FIG. 1 in the direction of the arrows.

As is best illustrated in FIGS. 1, 2 and 4, a solenoid 52 is secured to the front upstanding wall 43 of the carriage member 42 in alignment with the chuck 45. The solenoid 52 serves to stepwisely rotate the work-piece, and to this end its armature 53 or plunger, normally held in outwardly-extending position with respect to its energization coil 54 by springs 55, is provided with actuating fingers 56 and 57 in register with the saw teeth 50 and 51, respectively, of the chuck sleeve 47. When the coil 54 of the solenoid 52 is energized as hereinbelow described, the plunger 53 together with its fingers 56 and 57 will be drawn away from the chuck 45 against the compressional force of the solenoid springs 55. The finger 56 is resilient and bent at its outer end, and is so positioned as to slip over a saw tooth 50 of the ratchet wheel 48 and with the spring-loaded return motion of the plunger push its associated chuck sleeve 47 in rotative motion by an angular distance equal to the pitch of the ratchet teeth.

The finger 57 is also resilient, but has a straight end which falls into abutment with the root of a tooth 51 at completion of each rotative step to prevent retrograde movement of the chuck sleeve 47 under the stresses imposed by the slotting of the work-piece by the saw disc 36 as hereinbelow described.

Since there are 24 teeth on each of the ratchet wheels 48 and 49, a full revolution of the chuck sleeve 47 will be completed each time the solenoid 52 is actuated for the twenty-fourth time. The solenoid 52 is supported in its back and forth movement with the carriage channel member 42 by a leg 52a having an axle 58 at its lower end on which is journalled a roller 59 that rides upon the base plate 10. As illustrated in FIG. 1, bearing seats 60 are provided in the carriage member 42, one near its back end and one disposed intermediately, for locating and supporting for rotative motion the rear end of the work-piece W.

Means including a periodically actuated solenoid 61 is provided for stepwisely moving the carriage member 42 to the right (as seen in FIG. 1) by a predetermined distance each time a set of peripheral machining operations is completed on the work-piece. To this end, the front upstanding wall 43 of the carriage member 42 is provided along its upper edge with an equidistantly-spaced series of rectangular notches 62 the trailing edges of which are cut at an angle to provide ramp portions 63 communicating with the upper edge of said wall. The solenoid 61 has an armature or plunger 64 axially reciprocable in the solenoid core winding 65 and in spaced parallel relation to the carriage member 42. A vertical bolt 66 at the outer end of the plunger 64 carries one end of a tension spring 67, the other end of which is attached to a stanchion 68 fixed to the base plate 10, whereby said plunger is normally held in its outwardly-extending position. The bolt 66 also carries a perpendicularly inwardly-extending arm 69 the inner end of which rides on the upper edge of the upstanding wall 43 of the carriage member 42, as is best illustrated in FIGS. 1 and 4. As illustrated in FIG. 4, the underside of the arm 69 is beveled at its trailing edge to better seat upon the ramp portions 63 of the upstanding wall 43. A compression spring 70 is arranged on the bolt 66 to resiliently urge the arm 69 downwardly into contact with the upper edge of the upstanding wall 43.

The stroke of the plunger 64 of the solenoid 61 is somewhat greater than the distance between the notches 62 along the upstanding wall 43 of the carriage member 42, whereby each time the solenoid is energized, it will withdraw the plunger arm 69 from abutment with the leading edge of a notch 62 to a position in back of the leading edge of the next rearward notch 62. Upon completion of the interval of solenoid energization, the withdrawal of its plunger under the tensional force of the spring 67 causes the plunger arm 69 to move into abutting engagement with the rearward notch 62 to carry along the carriage member 42 by a distance equal to the distance between notches. Once moved to its new position, the carriage member is automatically locked in place by means of a dog 71 having an inwardly-extending nose portion 72 movable into locking engagement in a notch 62 of the carriage member 42. The dog 71 is resiliently held in locking engagement by means of a compression spring 73 arranged on a bolt 74 supporting said dog with respect to the guide channel member 40. Disengagement of the dog 71 for stepwise movement of the carriage member 42 by the solenoid 61 as described above, is effected by a slide cam 75 fixed to the plunger arm 69 for reciprocal movement therewith. The slide cam 75 extends along the outer wall 43 of the carriage member 42 and behind the dog 71, and has an outer end arm portion 76 of gradually increasing width normally extending forwardly of said dog, as is best illustrated in FIG. 1. When the solenoid is energized, the rearward movement of the slide cam 75, by virtue of its cam portion 76, withdraws the dog 71 from engagement in a notch 62 so that the carriage member 42 can be pushed forwardly, stepwisely, as described above. When the carriage member 42 has completed its stepwise movement, a new notch 62 will be in register with the dog nose portion 72 and the dog will fall in place under the urging of compression spring 73 to lock said carriage member in place against axial movement for the entire period during which a peripheral set of machining operations is automatically performed, as is hereinbelow more fully described.

Means is provided for automatically deenergizing the drive motor 11 and at the same time braking said motor to prevent over-run upon completion of the automatic machining of work-piece W. To this end, there is secured against the back upstanding wall 44 of the carriage member 42 at each end thereof, an outwardly-extending pair of abutment members 77 and 78. Upon completion of the machining of the work-piece, the carriage member 44 will have moved its full distance to the right (as seen in FIG. 1) and the abutment members 77 and 78 will simultaneously have come into contact with and actuated, respectively, a rockable abutment lever 79 and a toggle switch 80. The toggle switch 80 is secured to the outside of the inner wall 41 of the guide channel member 40, and constitutes a normally-closed single-pole single-throw switch connected in series with an energization circuit for the electric drive motor 11. This energization circuit includes conductors 81, 82, connector block 83, conductor 84, receptacle plug 85, conductor 86, main switch 87, conductor 88, connector block 89 and conductor 90. Assuming the main switch 87 to be close-circuited, it will thus be apparent that actuation of the toggle switch 80 will deenergize the motor 11.

Figure 3:
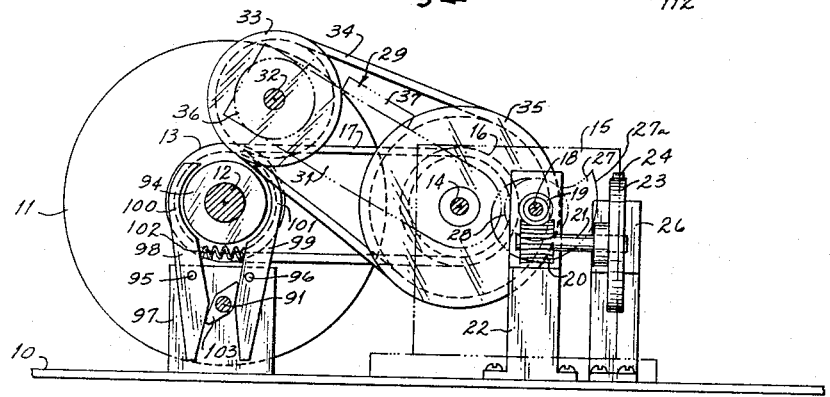
FIG. 3 is a vertical cross-sectional view, taken along the line 3—3 of FIG. 1 in the direction of the arrows.

As described above, at the same instant the toggle switch 80 is actuated to deenergize the drive motor 11, the abutment lever 79 will be actuated, i.e., turned to the right as seen in FIG. 1. As is best illustrated in FIGS. 1, 2 and 3, the lever 79 is radially attached at one end of a brake rod 91 journalled in bearing blocks 92 and 93 secured against the base plate 10. The outer end of the brake rod 91 terminates in spaced parallel relation beneath the outer end portion of the motor output shaft 12, which carries a brake drum 94. Rockably supported by pivot pins 95, 96 secured to a stanchion 97 fixed against the base plate 10, is a pair of opposed brake shoe members 98, 99 having arcuate brake shoes portions 100, 101, respectively, at one end, normally held in spaced relation with respect to opposed outer surface portions of the brake drum 94 by a compression spring 102 interconnecting the other ends of said brake shoe members. The brake rod 91 extends between the brake shoe members 98, 99 below the respective pivot pins 95, 96 thereof, and carries thereat a diamond-shaped cam 103 arranged and adapted to spread apart the lower ends of said brake shoe members when the lever 79 is actuated as described below. Such spreading apart of the lower ends of the brake shoe members 98, 99 moves the brake shoe portions 100, 101 into engagement with the brake drum 94 at the same time that the associated drive motor is automatically deenergized as described above, to stop coasting of the motor and thereby prevent any substantial over-run upon the completion of the automatic machining of a work-piece.

Considering now the energization circuit for the solenoid 52, the electrical terminals of the energization coil 54 thereof are connected through conductors 104 and 105 to spring-pressed electrical brushes 106, 107, respectively, supported in an insulating block 108 fixed with respect to the solenoid for movement in unison therewith. As illustrated in FIG. 2, the brushes 106 and 107 are in sliding contact, respectively, with contact bars 109, 110 secured along the outer wall 41 of the guide channel member 40, and insulated with respect thereto by interposed electrical insulating strips 111, 112. As illustrated in FIG. 1, the contact bars 109, 110 are connected in series with the micro-switch 28c and the source of electrical supply at the connector blocks 83 and 89 by electrical conductors 113, 114 and 115.

The energization winding 65 of the solenoid 61 is connected in series with the micro-switch 26 and the source of electrical supply at the connector blocks 83 and 89 by electrical conductors 116, 117 and 118.

Considering now the over-all operation of my machine for automatically machining tubular work-pieces, the front end of work-piece W, in the present example a rigid plastic tube to be made into well-points by slotting as illustrated in FIGS. 6 and 7, will be chucked in the mechanical chuck 45 as illustrated in FIG. 1, and the carriage member 42 will be positioned in starting position, i.e., in the left-hand end of the guide channel member 40 as seen in FIG. 1. Upon closing the main switch 87, the drive motor will actuate the gear reduction box 15 to turn the output shaft 18 continuously at reduced speed. The worm gear 19 and pinion 20 reduce the speed of the cam disc 23 by a ratio of 24 to 1, so that the disc cam member 27 and switch actuating cam 28 will make 24 revolutions for each revolution of the cam disc 23. Each revolution of the cam disc member 27 causes the yoke member 29 together with its continuously rotating saw disc 36 to swing downwardly, as illustrated by the broken-line representation of said saw disc in FIG. 5, to form an axial slot S in the work-piece. Upon the completion of the slotting operation and the upward return of the yoke member 29, under the tensional force of the spring 39, the cam lobe portion 28a of the switch actuating cam 28 will move into abutment with switch arm 28b, to close circuit for a short interval its associated normally open-circuit micro-switch 28c. This temporarily completes the above-described energization circuit to the solenoid 52, to rotatively advance the work-piece W by one twenty-fourth of a complete circle or 15 circular degrees, as hereinabove described. The above described operation continues until the work-piece has been rotatively stepped and slotted twenty-four times to complete a peripheral set of machining operations, at which time the cam lobe 24 of the cam disc 23 will next move into actuating abutment with the micro-switch 25 associated with the normally open circuit micro-switch 26, to close circuit, for a short interval of time, the above-described energization circuit to the solenoid 61. The resulting actuation of the solenoid 61 stepwisely advances the carriage member 42, as described above, to position the work-piece for the next set of peripheral machining operations (slotting, in the illustrated embodiment). This operation is cyclically repeated until the carriage member 42 has travelled its full length from left to right (as seen in FIG. 1) in the guide channel member 40, whereupon the drive motor will be automatically deenergized and braked to prevent over-run, as hereinabove described.

It is to be noted that cam lobe 28a of the cam 28, and cam lobe 24 of the cam 23, which control operation of the solenoids 52 and 61, respectively, are so positioned as to operate said solenoids at times when the yoke member 29 is in its uppermost position, i.e., with the saw disc 36 in removed position with respect to the work.

While there is illustrated and described herein only one form in which my invention can conveniently be embodied in practice, it is to be understood that this form is presented by way of example only, and not in a limiting sense. For example, while I have illustrated and described a single carriage member, it will be obvious that my machine is also well adapted to the used of a plurality of carriage members and a corresponding number of disc saws in parallel for multiplying work output per unit time.

The invention, in brief, includes all the modifications and embodiments coming within the scope and spirit of the following claims.

What I claim as new and desire to secure by Letters Patent is:

1. In a device for automatically and continuously machining elongated work-pieces, the combination comprising, an elongated work-piece carriage member, means for guiding said carriage member in translational motion, a rotatable chuck in said carriage member supporting one end of an elongated work-piece therein for coextensive movement with said carriage member, mechanism including said rotatable chuck for stepwisely and sequentially rotating and machining said work-piece to produce in said work-piece a peripheral group of machine operations, and mechanism controlled by the completion of each 360 circular degree peripheral group of machine operations for stepwisely axially advancing said carriage member in said guiding means, said stepwise rotating and stepwise advancing means being controlled by first and second solenoids, respectively, said first solenoid having a first normally-open electrical energization circuit and a first cam means controlled by said machining mechanism for periodically closing said first energization circuit, said second solenoid having a second normally-open electrical energization circuit and a second cam means controlled by said machining mechanism for periodically closing said second energization circuit, the frequency of closing said first electrical circuit by said first cam means being a multiple of that of the closing of said second electrical circuit by said second cam means.

2. A device for automatically machining elongated work-pieces as defined in claim 1, wherein said machining mechanism comprises a rotary disc saw, drive means for rotating said disc saw, and mechanism for swingingly supporting said disc saw for movement between two positions in and out of contact with the work-piece.

3. A device for automatically machining elongated work-pieces as defined in claim 2, wherein said drive means comprises an electric motor and an energization circuit for said motor, and means controlled by the movement of said carriage member to an end position with respect to said guiding means for deenergizing said motor circuit.

4. A device for automatically machining elongated work-pieces as defined in claim 3, including mechanism for braking said electric motor rotor simultaneously with said deenergization of said motor circuit to prevent over-run.

5. In a device for automatically machining elongated cylindrical work-pieces, the combination comprising, an elongated work-piece carriage, a chuck mechanism mounted in said carriage at one end thereof for supporting one end of a work-piece coaxially disposed on said carriage, mechanism for stepwisely rotating said chuck mechanism for correspondingly rotating a work-piece on said carriage and supported by said chuck mechanism, an elongated guide member supporting said carriage for translational motion with respect thereto, a machining tool, mechanism for repeatedly moving said machining tool between positions in and out of engagement with the work-piece, means controlled by said tool moving means for actuating said chuck rotating mechanism each time said machining tool is in a position out of engagement with respect to said work-piece, mechanism for stepwisely advancing said carriage along said guide member, and means controlled by said tool moving means for actuating said carriage advancing mechanism each time said chuck rotating mechanism has been actuated for a predetermined whole number of times, said tool moving means comprising an electrical drive motor and said machining tool comprising a rotary disc saw rotated by said drive motor, the plane of said disc saw being substantially parallel with the longitudinal axis of the work-piece for producing axially-extending slots in said work-piece.

6. A device for automatically machining elongated cylindrical work-pieces as defined in claim 5, wherein said advancing mechanism is actuated each time said chuck rotating mechanism has been actuated a sufficient number of times to complete a full revolution of the work-piece.

7. A device for automatically machining elongated cylindrical work-pieces as defined in claim 5, wherein said stepwise chuck rotating mechanism and said carriage advancing mechanism are controlled by a first and a second solenoid, respectively, said first solenoid having a first normally-open electrical energization circuit and a first cam member driven by said drive motor and operative to periodically close said first energization circuit, said second solenoid having a second normally-open electrical energization circuit and a second cam member driven by said drive motor and operative to periodically close-circuit said second energization circuit.

8. A device for automatically machining elongated cylindrical work-pieces as defined in claim 7, including an energization circuit for said drive motor and means controlled by the movement of said carriage to an end position with respect to said guide member for deenergizing said motor circuit.

9. A device for automatically machining elongated cylindrical work-pieces as defined in claim 8, including mechanism for braking said electric motor rotor simultaneously with said deenergization of said motor circuit to prevent over-run.

10. A device for automatically machining elongated cylindrical work-pieces as defined in claim 8, wherein said chuck mechanism rotating mechanism comprises peripheral ratchet teeth, and a push finger secured to the plunger of said first solenoid and operative to engage one of said ratchet teeth and rotatively push against it each time said first solenoid is energized.

11. A device for automatically machining elongated cylindrical work-pieces as defined in claim 8, wherein said carriage advancing mechanism comprises plurality of notches arranged in spaced relation along said carriage, and push mechanism secured to the plunger of said second solenoid and operative to engage in one at a time of said notches and push said carriage stepwisely each time said second solenoid is energized.

References Cited

UNITED STATES PATENTS

| 392,130 | 10/1888 | Moreau | 83—267 X |
| 1,125,351 | 1/1915 | Liebig | 144—95 |
| 1,398,320 | 11/1921 | Dunsworth | 83—267 X |
| 1,511,415 | 10/1924 | McEvoy. | |
| 2,630,862 | 3/1953 | Musser et al. | 83—267 X |

WILLIAM W. DYER, Jr., *Primary Examiner.*

JAMES M. MEISTER, *Examiner.*

WILLIAM S. LAWSON, *Assistant Examiner.*